US007434343B2

(12) United States Patent
Yoshida

(10) Patent No.: US 7,434,343 B2
(45) Date of Patent: Oct. 14, 2008

(54) CLIP AND ATTACHMENT WITH CLIP USING THE CLIP

(75) Inventor: Tsukasa Yoshida, Tokyo (JP)

(73) Assignee: NS Planning Inc., Tokyo (JP)

( * ) Notice: Subject to any disclaimer, the term of this patent is extended or adjusted under 35 U.S.C. 154(b) by 203 days.

(21) Appl. No.: 10/535,179

(22) PCT Filed: Dec. 26, 2003

(86) PCT No.: PCT/JP03/16880

§ 371 (c)(1),
(2), (4) Date: Dec. 27, 2005

(87) PCT Pub. No.: WO2004/060695

PCT Pub. Date: Jul. 22, 2004

(65) Prior Publication Data

US 2006/0130384 A1 Jun. 22, 2006

(30) Foreign Application Priority Data

Dec. 27, 2002 (JP) ............................. 2002-382244
Sep. 17, 2003 (JP) ............................. 2003-324180

(51) Int. Cl.

| | |
|---|---|
| ***G09F 3/16*** | (2006.01) |
| ***G09F 3/20*** | (2006.01) |
| ***G09F 23/10*** | (2006.01) |
| ***G09F 3/18*** | (2006.01) |
| ***G09F 15/00*** | (2006.01) |
| ***G09F 15/02*** | (2006.01) |
| ***A44B 1/04*** | (2006.01) |
| ***A44B 11/25*** | (2006.01) |
| ***A45F 5/00*** | (2006.01) |
| ***A45F 3/00*** | (2006.01) |
| ***B60R 9/00*** | (2006.01) |

(52) U.S. Cl. ............................. 40/666; 40/658; 40/641; 40/654; 40/645; 40/607.05; 40/610; 40/607.06; 24/67 R; 24/67.9; 224/269; 224/666; 224/668; 224/331; 150/137; 150/125; 150/126

(58) Field of Classification Search .................. 40/666, 40/658, 641, 659, 645, 607.05, 610, 607.06; 24/67 R, 67.9; 224/269, 668, 666, 231; 150/137, 150/125, 126
See application file for complete search history.

(56) References Cited

U.S. PATENT DOCUMENTS 1,914,671 A 6/1933 O'Neil
(Continued)

FOREIGN PATENT DOCUMENTS

DE 8903584 U1 9/1989
(Continued)

OTHER PUBLICATIONS

Japanese Laid Open Patent Application No. 11-32822.
(Continued)

*Primary Examiner*—Lesley D. Morris
*Assistant Examiner*—Syed A Islam
(74) *Attorney, Agent, or Firm*—Sughrue Mion, PLLC

(57) ABSTRACT

A portable attachment (1) with a clip allowed to be easily fitted to a portable object by integrally holding a specified used-article such as a diverging component-contained material having a smell components or medically effective components and the clip, wherein an intermediate material (5) and a rear sheet material (6) are stacked on the rear side of a synthetic resin front sheet material (4) and the peripheral edge portion thereof is sealed to form a front storage part (7) and a rear storage part (8), and the front storage part forming an opening part (9) with a fastener (20) in the upper part thereof and partly having a ventilation part (21) stores the diverging component-contained material so as to be extracted and retrieved and the rear side storage part (8) is formed such that the one end part (3*a*) thereof for holding the clip (3) is inserted into clip insert storage parts (8*a*) separately formed on both sides thereof and the other end part (3*b*) thereof for holding the clip is formed to have a locking part to an installed part, whereby an objective material according to the purposes thereof can be inserted also into the rear storage part (8).

6 Claims, 12 Drawing Sheets

U.S. PATENT DOCUMENTS

| | | | | | |
|---|---|---|---|---|---|
| 2,567,602 | A | * | 9/1951 | Higgins | 224/231 |
| 4,384,417 | A | | 5/1983 | Thompson | |
| 4,967,450 | A | | 11/1990 | Adkins | |
| 5,170,535 | A | * | 12/1992 | Strong | 24/67.9 |

FOREIGN PATENT DOCUMENTS

| | | | |
|---|---|---|---|
| FR | 2666386 | A | 3/1992 |
| JP | 28-7905 | Y1 | 8/1953 |
| JP | 50-6422 | Y1 | 2/1975 |
| JP | 05007486 | U | 2/1993 |
| JP | 2002-140669 | A | 5/2002 |

OTHER PUBLICATIONS

Microfilm of the specification and drawings annexed to the request of Japanese Utility Model Application No. 85547/1973 (Laid-open No. 32011/1975) Yoshihiro Yamaguchi, Apr. 8, 1975.

CD-ROM of the specification and drawings annexed to the Request of Japanese Utility Model Application No. 62474/1992 (Laid-open No. 7486-1993) Keizo Miyamoto, Feb. 2, 1993.

* cited by examiner

CLIP AND ATTACHMENT WITH CLIP USING THE CLIP

This is a National Stage entry of International Application PCT/JP2003/016880, with an international filing date of Dec. 26, 2003, which was published under PCT Article 21(2) as WO Publication 2004/060695 A1, and the complete disclosure of which is incorporated into this application by reference

TECHNICAL FIELD

The present invention relates to a clip and an attachment with a multipurpose clip which can be used while being easily attached to a portable object or the like, particularly to clothes, and which can be suitably used on a back cover of a file or the like.

BACKGROUND ART

There is conventionally known a scented bag that contains a volatile matter such as a perfume, which scented bag is suspended on the chest by a chain or put in a pocket and variously contrived (see, for example, Japanese Patent Application Laid-Open No. 11-32822).

Meanwhile, clips in various forms are disclosed. Every clip is used to clip two objects.

Further, a transparent synthetic resin sheet having both side ends bonded by an adhesive or the like, and having a generally rectangular portrait shape is provided on a back cover of a file for bundling documents into a booklet or the like so that a back cover index sheet or the like can be inserted into the file.

A method for inserting the back cover index sheet or the like into such a file includes opening and inverting the file or the like, forming an insertion opening, and inserting the back cover index sheet or the like into the insertion opening. It takes lots of time and labor to perform this operation because of the need to invert the file or the like.

DISCLOSURE OF THE INVENTION

The present invention provides a clip and an attachment with a multipurpose clip which have been achieved from a viewpoint different from the above-stated conventional concept, which are handy to carry, which look attractive, and which can be easily attached particularly to clothes or a back cover of a file or the like.

To solve the conventional problems, the present invention is characterized by constituting an attachment with a clip, which attachment includes at least one storage part formed by a synthetic resin sheet material, the storage part storing an object used according to a purpose, the storage part including the clip by inserting and attaching a clipping one end portion of the clip, which portion forms a clipping part, into the storage part, a clipping other end portion of the clip serving as a locking part locked at an attachment target part. It is preferable to constitute an attachment with a clip, which attachment includes at least two storage parts each formed by a synthetic resin sheet material, one of the storage parts storing an object used according to a purpose or a material that contains an emanative component such as a volatile component while forming a ventilation part therein, the other storage part including at least the clip by inserting and attaching a clipping one end portion of the clip, which portion forms a clipping part, into the other storage part, a clipping other end portion of the clip serving as a locking part locked at an attachment target part.

Further, the present invention is characterized by constituting an attachment with a clip, wherein at least two synthetic resin sheet materials are laminated on a rear side of a front sheet material consisting of synthetic resin, peripheral edges are sealed except for an opening part to form storage parts, the front sheet material-side storage part serving as a storage part that stores an object used according to each purpose, the object being freely output and input, or a material that contains an emanative component such as a volatile component with the opening part closable except for a ventilation part, the rear storage part serving as an attachment part, a clipping one end portion of the clip, which portion forms a clipping part, inserted into at least the attachment part, a clipping other end portion of the clip serving as a locking part locked at an attachment target part.

The rear storage part out of the two storage parts can be constituted to form clip insert storage parts on both sides, respectively, or constituted to be formed as the clip insert storage parts located on the both sides. Preferably, a data transmittable and receivable IC chip is stored in the storage part.

Examples of the clip used for these attachments with the clip include a clip, wherein a clipping one end portion is formed by bending a wire material into a generally U shape or a generally inverted-U shape, clipping other end portions are formed by bending upper ends of the clipping one end portion outward so as to be parallel to an outside of the generally U shape or the general inverted-U shape, a width of each of the clipping other end portions is set equal to or smaller than a width of a back cover of a file; a clip, wherein a clipping one end portion or a clipping other end portion is formed by bending a wire material into a generally U shape or a general inverted-U shape, clipping other end portion or clipping one end portion is formed by bending upper ends of the clipping one end portion or the clipping other end portion inward or outward so as to be parallel to an inside or outside of the generally U shape or the generally inverted-U shape, a position of a lower end of one of the clipping one end portion or the clipping other end portion thus bent inward or outward is higher than a position of a lower end of the other clipping one end portion or the other clipping other end portion; a clip, wherein a clipping one end portion is formed by bending a wire material into a generally U shape or a generally inverted-U shape, clipping other end portions are formed by bending upper ends of the clipping one end portion inward or outward so as to be parallel to an outside or inside of the generally U shape or the general inverted-U shape, and by connecting both ends of the bent upper end by a holding tool having a thickness larger than a diameter of the wire material; and a clip having a data transmittable and receivable IC chip included in a clipping one end portion.

The present invention can provide the portable attachment that integrally holds the object to be used, e.g., a material that contains a volatile component into which a scent component, a medicinal component or the like is impregnated or mixed, or the other emanative component, such as a vegetable, a cosmetic product or a medical or pharmaceutical product, the other desired object to be used, and the clip. This portable attachment can be detachably fixedly attached to a pocket or the like, and the desired scent, medicinal effect or the like can be emanated. The attachment target is not limited to the clothes but may be a purse, a card case, a book, or the like. The portable attachment can be held as a bookmarker. It is particularly suitable to use the portable attachment for the back cover of the file. The desired object to be used may be an arbitrary one, for example, a nameplate, a passport, or a non-contact data transmitter-receiver sheet including an IC chip. A decoration can be given on a front side of the front sheet material. A sheet-like liquid crystal display or an LED display can be provided on the front side of the front sheet material to display a name or the like so as to exhibit a display effect such as a nameplate.

BRIEF DESCRIPTION OF THE DRAWINGS

FIG. 11 is a front view showing one embodiment of the clip of the portable attachment according to the present invention, which clip is designed to be easily attached to a back cover of a file or the like.

BEST MODE FOR CARRYING OUT THE INVENTION

Embodiments of the present invention will be described with reference to the drawings.

Figure 1:
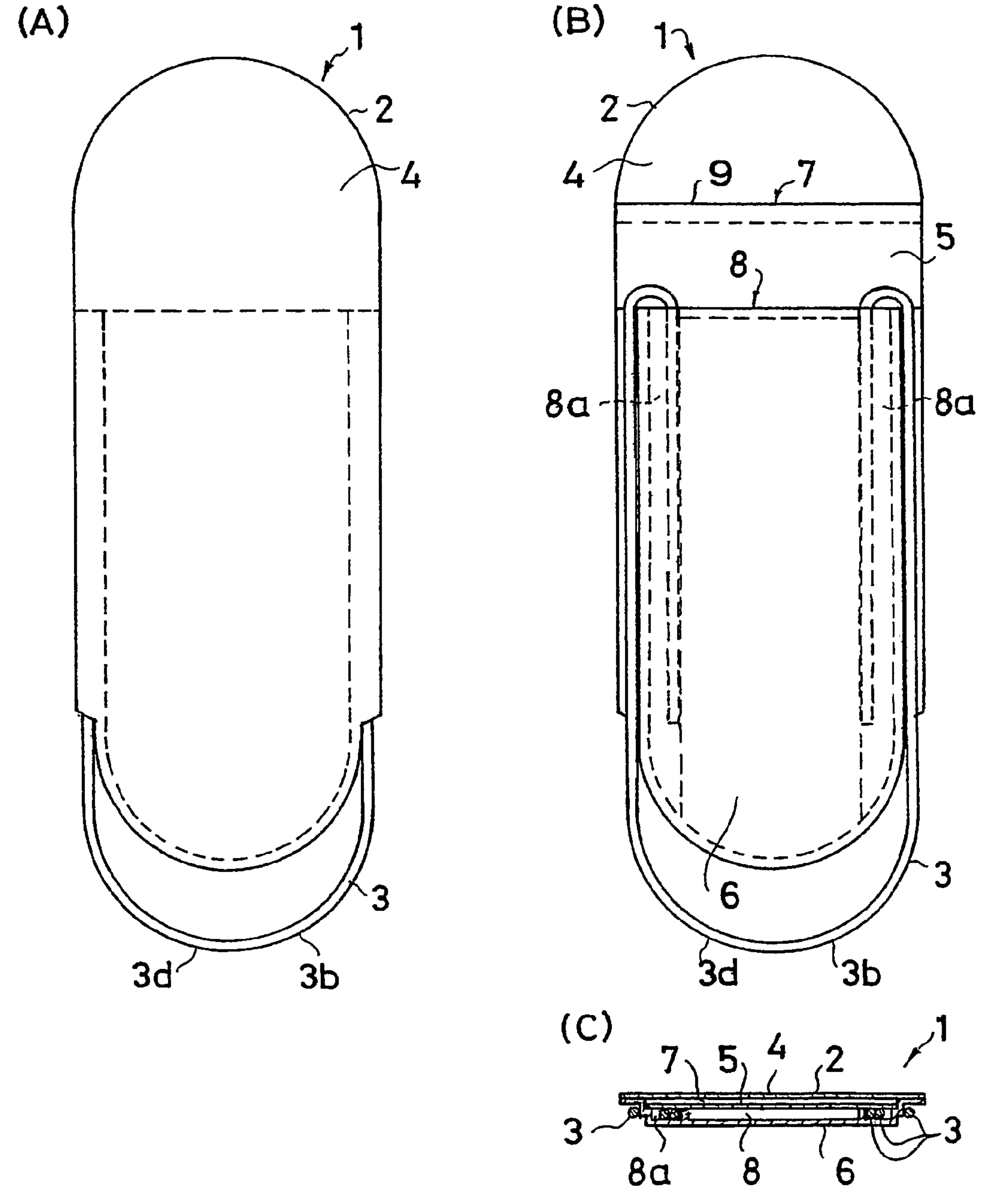
FIG. 1 shows one embodiment of a portable attachment according to the present invention, wherein (A) is a front view of the portable attachment, (B) is a rear view thereof, and (C) is a cross-sectional view thereof.
Figure 2:
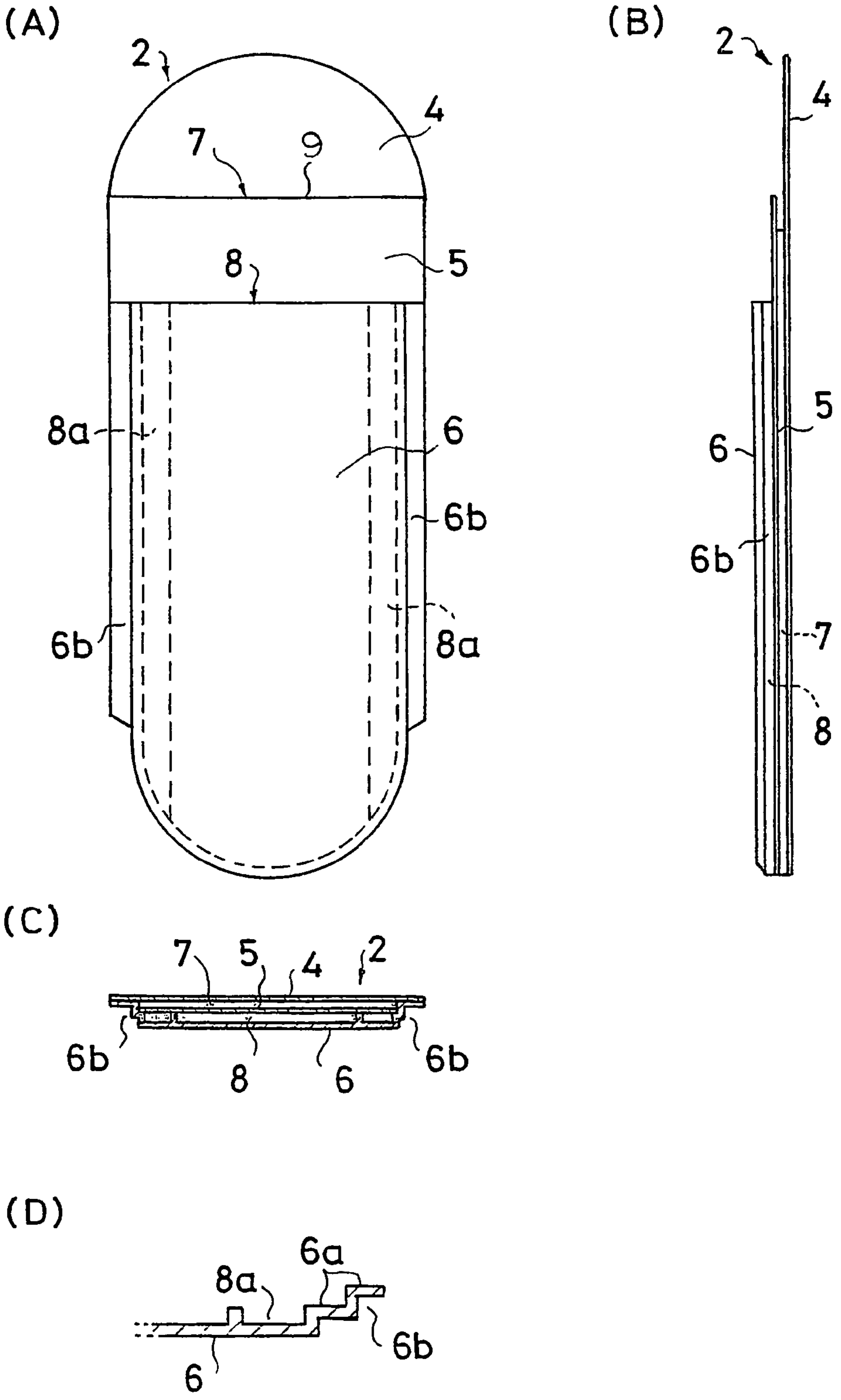
FIG. 2 shows a storage body shown in FIG. 1, wherein (A) is a rear view of the storage body, (B) is a side view thereof, (C) is a cross-sectional view thereof, and (D) is a partially sectional view thereof that shows an end of a rear sheet material.
Figure 3:
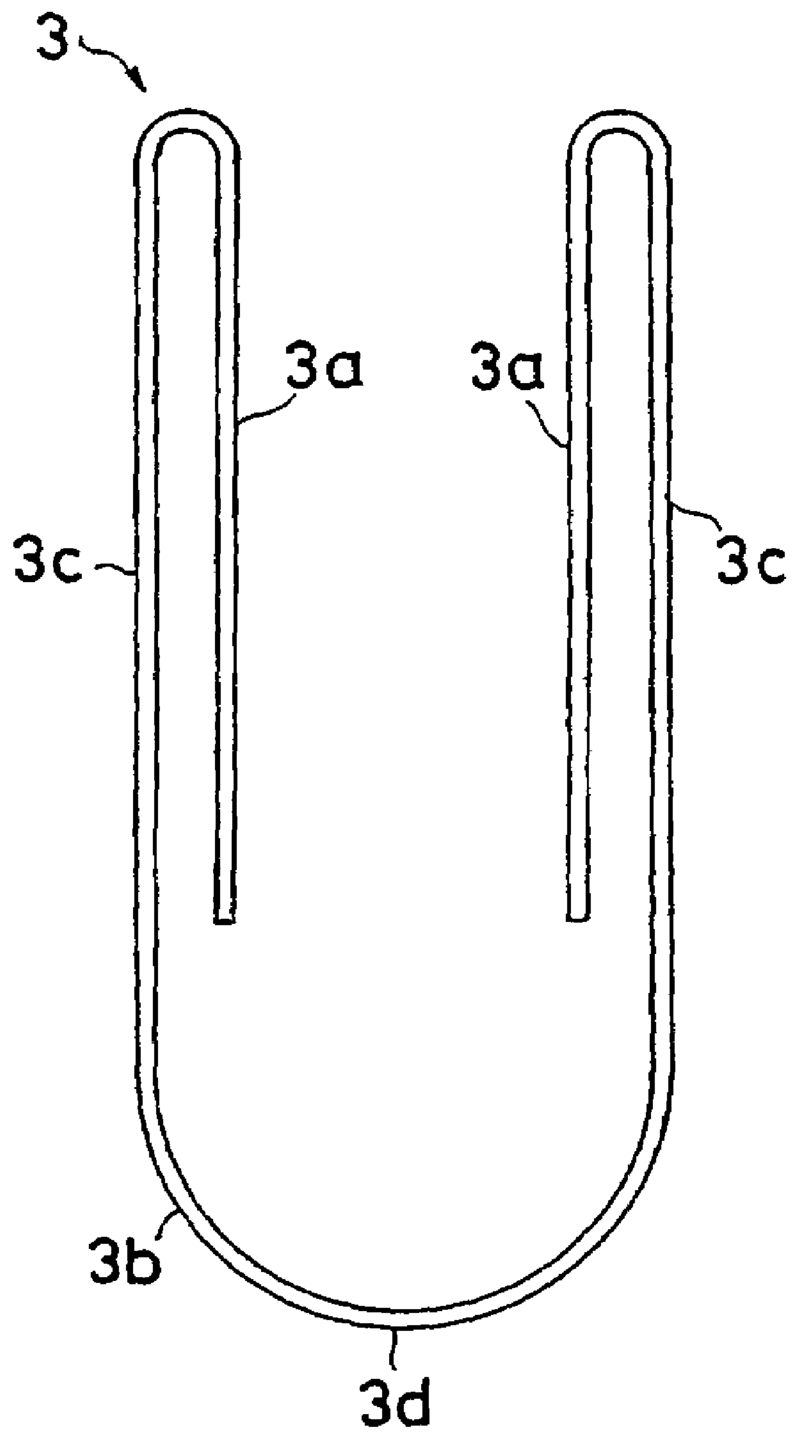
FIG. 3 is a front view of a clip shown in FIG. 1.

FIG. 1 shows an attachment with a clip in one embodiment of the present invention, FIG. 2 shows a storage body of the attachment, and FIG. 3 shows a clip. Reference symbol 1 denotes the attachment with a clip, 2 denotes the storage body, and 3 denotes the clip.

The storage body 2 is constituted by forming a front sheet material 4 of a synthetic resin material or a transparent synthetic resin material matched to a purpose such as a decoration or a nameplate, laminating two synthetic resin materials of an intermediate sheet material 5 and a rear sheet material 6, sealing peripheral edges except for an opening part by thermal bonding, an adhesive, or the like, and thereby forming a front storage part 7 and a rear storage part 8. In this case, inner positions of the rear storage part 8 are sealed along both side ends of the intermediate sheet material 5 and the rear sheet material 6, which inner positions are away from the both side ends at appropriate distances, so as to define clip insert storage parts 8*a*, into which clipping one end portions 3*a* can be inserted, on both sides of the rear storage part 8.

The respective sheet materials may be a laminate of flat sheet materials. As shown in FIG. 1(C), the rear sheet material 6 can be formed into an accept case shape having peripheral edges slightly raised in a front direction and thereby having a three-dimensional shape by thermoforming such as pressure/vacuum forming or by injection molding, and the intermediate sheet material 5 and the front sheet material 4 can be formed to spread on a front side.

This case-shaped rear sheet material 6 can be constituted to provide two small steps 6*a* on each of front-side peripheral edges except for upper edges, and to form storage parts 6b with which vertical parts 3*c* of the clip 3 exposed outward to rear side edges on the both ends can be abutted. Edges of the intermediate sheet material 5 may be sealed to the inner-side steps 6*a*, and those of the front sheet material 4 may be sealed to the front-side steps 6*a*.

An upper end of the intermediate sheet material 5 is set to have a height equal to or smaller than that of the front sheet material 4. In the drawings, the height of the upper end of the intermediate sheet material 5 is set appropriately smaller, thereby providing an opening part 9 which is not sealed along an upper edge of the intermediate sheet material 5 so that an emanative component of a stored object stored in the front storage part 7 can emanate externally.

An upper end of the rear sheet material 6 is set at a position equal to or lower than that of the opening part 9 of the intermediate sheet material 5, and an unsealed opening part is provided along an upper edge of the rear sheet material 6.

Figure 4:
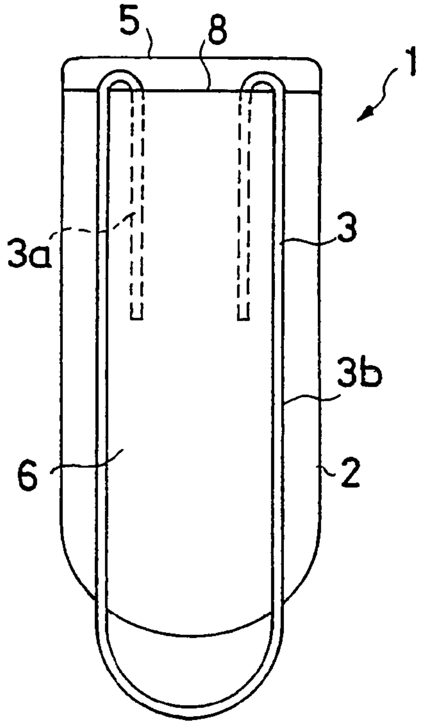
FIG. 4 is a rear view of another embodiment of the portable attachment according to the present invention.
Figure 5:
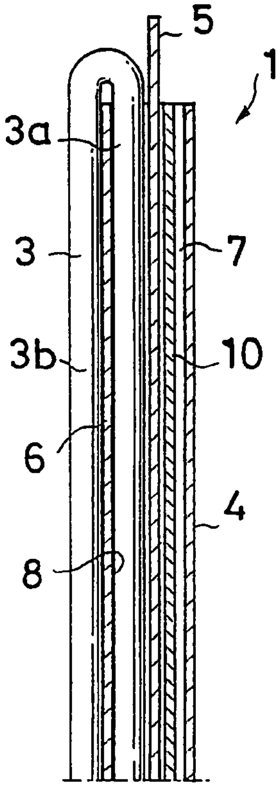
FIG. 5 is a schematic side sectional view of the portable attachment shown in FIG. 4.

FIG. 4 or 5 shows another embodiment of the storage body 2.

This storage body 2 is constituted so that the upper end of the intermediate sheet material 5 is formed to be higher than the front sheet material 4 and the rear sheet material 6, and so that peripheral edges except for the opening part are sealed by thermal bonding, the adhesive, or the like, thereby forming the front storage part 7 and the rear storage part 8.

A card 10 or the like such as a nameplate is inserted into the front storage part 7 and the clipping one end portions 3*a* of the clip 3 are inserted into the rear storage part 8, whereby the attachment 1 can be used as a nameplate or the like.

Figure 6:
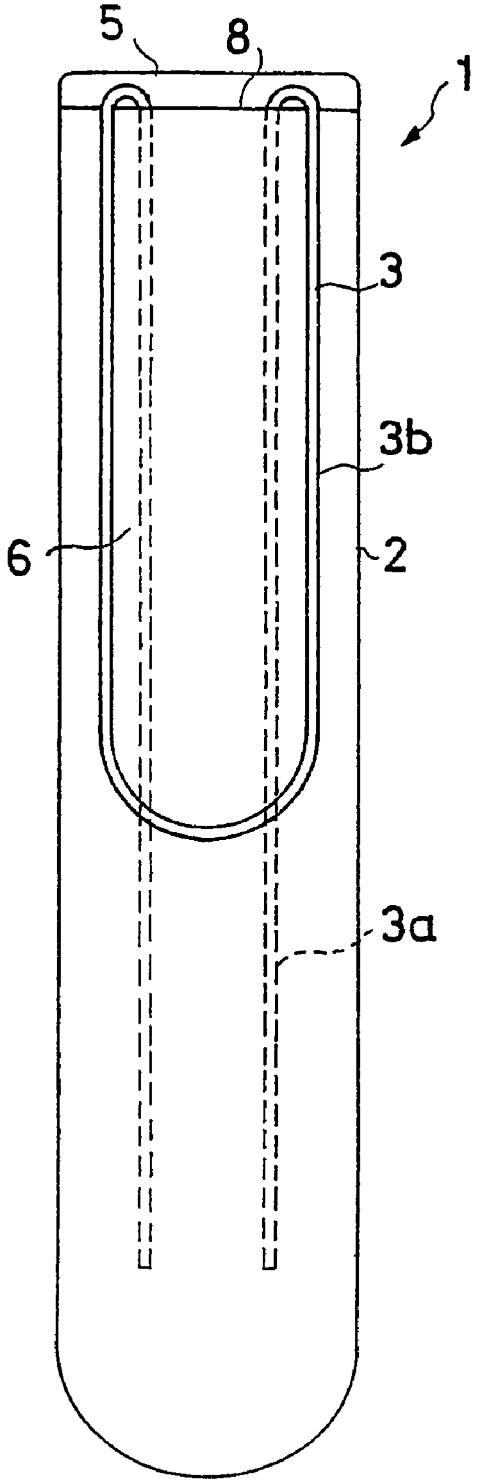
FIGS. 6 to 8 are rear views showing embodiments of the storage body of the portable attachment according to the present invention.
Figure 7:
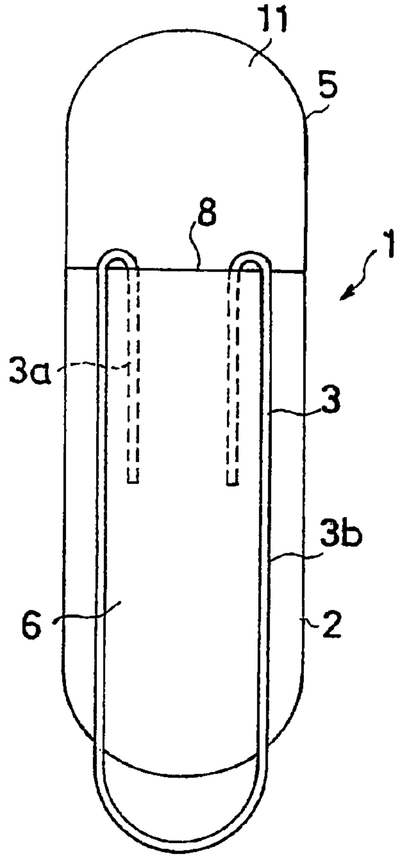
Figure 8:
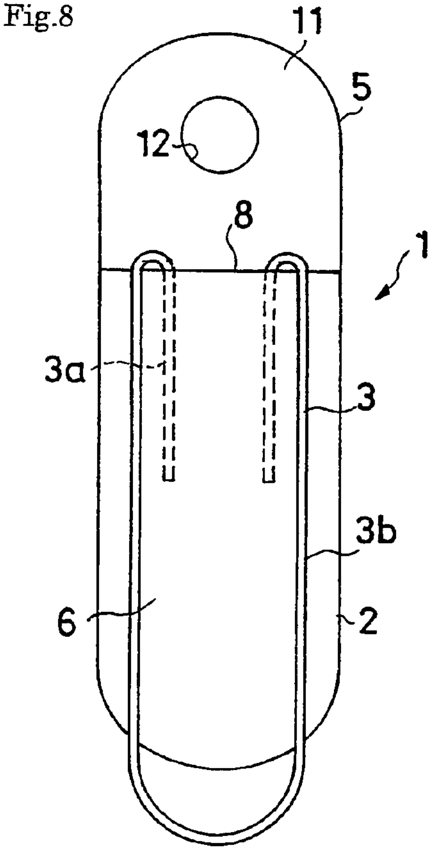
Figure 9:
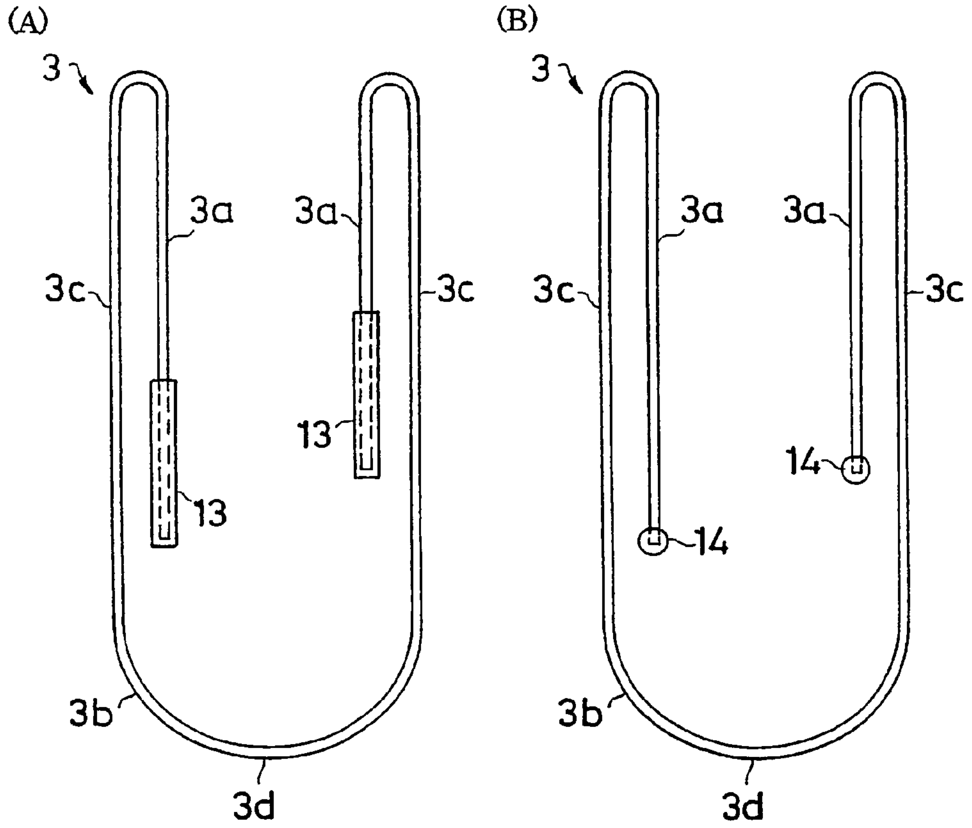
FIG. 9 is a front view showing embodiments of the clip of the portable attachment according to the present invention with synthetic resin materials bonded to tip ends of respective clipping other end portion, wherein (A) shows an embodiment of forming the tip ends into tube shapes and (B) shows an embodiment of forming the tip ends into spherical shapes.

Further, the storage body 2 can be constituted so that the front storage part 7 and the rear storage part 8 are formed portrait as shown in FIG. 6, so that an upper end piece 11 is formed by extending the upper end of the intermediate sheet material 5 upward as shown in FIG. 7, or so that a circular hole 12 is formed on a surface of the upper end piece 11 as shown in FIG. 8.

The storage body 2 may be formed to include one storage part, although not shown in the drawing. In this case, the storage body 2 can be constituted so that the peripheral edges of the front sheet material 4 and the rear sheet material 6 are sealed except for the opening part thereof by the thermal bonding, the adhesive, or the like without using the intermediate sheet material 5, thereby forming one storage part.

As shown in FIGS. 1 to 3, the clip 3 is constituted so that the clipping one end portions 3*a* inserted into the respective clip insert storage parts 8*a* and a clipping other end portion 3*b* exposed outward of the storage part and serving as a clipping part for clipping the attachment target are formed by bending a steel wire material so that the clipping one end portions 3*a* are located inside of the other end portion 3*b*, and so that a restoring force acts against an appropriate pressure (a pressure applied by a fingertip) applied on the both ends in a front or rear direction.

In FIG. 3, the steel wire material is bent into a U shape, upper ends of the U-shaped steel wire material are bent inward to be parallel to an inside of the U shape or the ends are further folded inward to form the clipping one end portions 3*a* so as to prevent the clip 3 from being easily detached although not shown in the drawings. Alternatively, the one ends may be further bent into small U-shapes so that the attachment target can be clipped between the both ends in an inward or outward direction. While these inner clipping one end portions 3*a* are inserted into the respective clip insert storage parts 8*a*, the vertical parts 3*c* of the outer clipping other end portions 3*b* are stored in respective storage parts 6*b* of the rear sheet material 6, and an U-shaped lower end 3*d* is provided to protrude downward of the rear sheet material 6. Cuts may be formed on surfaces of the clipping one end portions 3*a* by press work to prevent the clip 3 from being easily detached.

The clip may consist of synthetic resin, in this case, the one end portions may be flat and the bent shape of the clip may be an appropriate shape other than those shown in the drawings.

The attachment 1 with the clip shown in FIGS. 1 to 3 is formed by inserting the clipping one end portions 3*a* into the respective clip insert storage parts 8. Alternatively, the clipping one end portions 3*a* of the clip 3 may be formed to be bonded to the intermediate sheet material 5 or the rear sheet material 6 by a high frequency, a heat, or the like.

FIGS. 9 to 13 show other embodiments of the clip 3.

The clip 3 shown in FIG. 9(A) is formed by bonding tube-like synthetic resin materials 13 such as vinyl materials to lower ends of the respective clipping one end portions 3*a* by a heat or the like. The clip 3 shown in FIG. 9(B) is formed by bonding spherical synthetic resin materials 14 such as vinyl materials thereto by the heat or the like. By so forming, it is possible to prevent the clip 3 from being easily detached and prevent objects from being damaged by tip ends of the clipping one end portions 3*a*.

Figure 10:
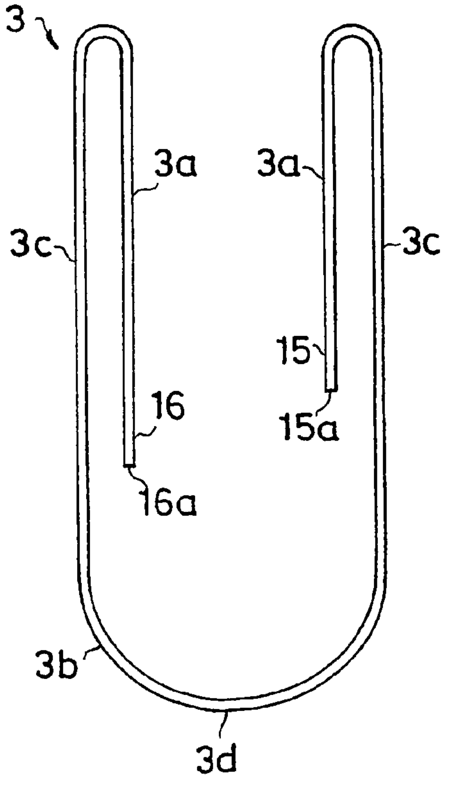
FIG. 10 is a front view showing one embodiment of the clip of the portable attachment according to the present invention with a lower end of one clipping one end portion located at a higher portion than a position of a lower end of the other clipping one end portion.

The clip 3 shown in FIG. 10 is formed so that a position of a lower end 15*a* of one clipping one end portion 15 is higher than that of a lower end 16*a* of the other clipping one end portion 16. By so forming, when the clip 3 is attached to the storage body 2, the other clipping one end portion 16 can be inserted first into the storage body 2 and the one clipping one end portion 15 can be inserted next into the storage body 2, thus facilitating an insertion operation. The lower end 15*a* or 16*a* of either clipping one end portion 15 or 16 may be located upward.

Alternatively, the clipping one end portions 3*a* can be set as the clipping other end portion 3*b* and the clipping other end portion 3*b* can be set as the clipping one end portions 3*a*. If so, the attachment can be easily attached to the attachment target.

Figure 11:
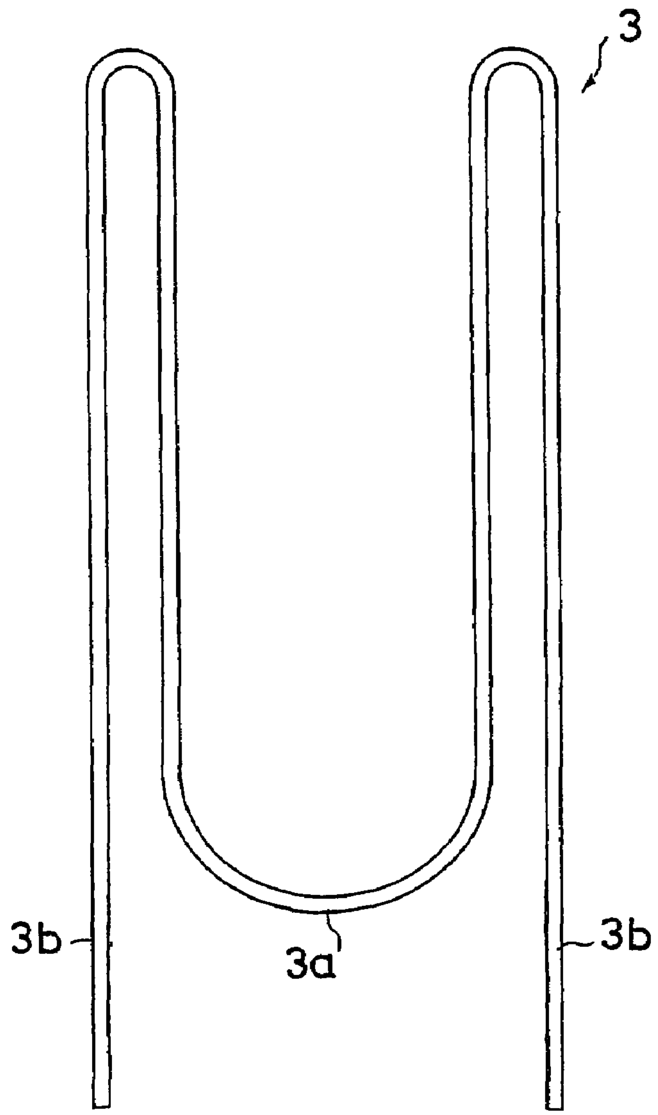

The clip 3 shown in FIG. 11 is constituted so that a wire material is bent into a generally U shape to form a clipping one end portion 3*a*, and so that upper ends thereof are folded outward to form clipping other end portions 3*b* to be parallel to an outside of the generally U-shaped clipping one end portion 3*a*. Alternatively, although not shown in the drawings, the end portions can be folded further inward or the other end portions can be folded further into generally U shapes so as to prevent the clip 3 from being easily detached. The synthetic resin materials such as vinyl materials may be bonded to lower ends of the respective clipping other end portions 3*b* by the heat or the like, similarly to the clip 3 shown in FIG. 9.

The clip 3 is formed so that a width of each clipping other end portion 3*b* of this clip 3 is set to be equal to or smaller than a width of the back cover or the like of the file for bundling documents into a booklet, preferably set to be matched to the width of the back cover. By doing so, the clip 3 can be attached to the back cover of the file or the like. If the clip 3 is formed so that the width of each clipping other end portion 3*b* is set matched to the width of the back cover, the clip 3 can be attached along a fold without positional deviation. Further, since the clipping one end portion 3*a* is located on a surface of the back cover, it is possible to ensure that the clip 3 clips objects.

Figure 12:
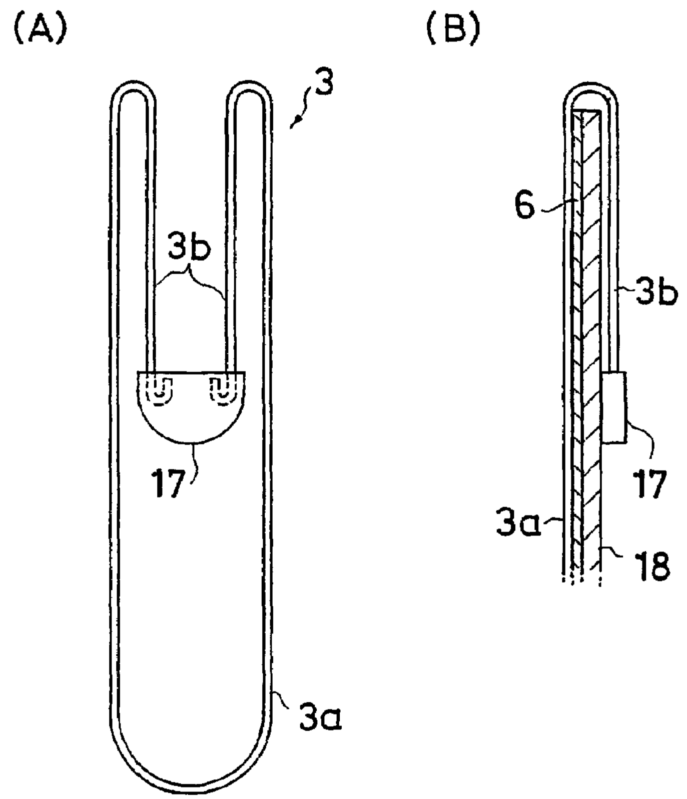
FIG. 12 (A) is a front view showing one embodiment of the clip of the portable attachment according to the present invention, which clip is constituted to strongly clip attached parts, and (B) is an enlarged side view of (A).

The clip 3 shown in FIG. 12 is constituted so that a wire material is formed into a U shape to provide the clipping one end portion 3*a*, so that upper ends thereof are folded inward to be parallel to an inside of the generally U-shaped clipping one end portion 3*a*, and so that both ends of the clipping one end portion 3*a* are connected by a holding tool 17 having a semi-circular lower part to thereby provide the clipping other end portions 3*b*. A thickness of the holding tool 17 is set slightly larger than a diameter of the wire material. The holding tool 17 can be formed integrally with the wire material by injection-molding synthetic resin. However, the holding tool 17 is not limited to this. It suffices that the holding tool 17 can hold and connect the both ends of the clipping one end portion 3*a* and a thickness of the holding tool 17 is set larger than a diameter of the wire material. The holding tool 7 which can hold the both ends can be formed separately from the clip 3 and connected.

This clip 3 is formed so that the thickness of the holding tool 17 is larger than the diameter of the wire material. Due to this, when the clip 3 is attached to the attachment target 18, the clipping other end portions 3*b* are slightly warped outward to strongly hold the attachment target 18 therebetween and thereby make it difficult to detach the clip 3.

Furthermore, if very small irregularities are provided on a surface of the holding tool 17 (a surface on which the holding tool 17 holds attached objects) so that the holding tool 17 is roughened, an anti-slipping function can be given to the holding tool 17, thereby making it more difficult to detach the clip 3.

Figure 13:
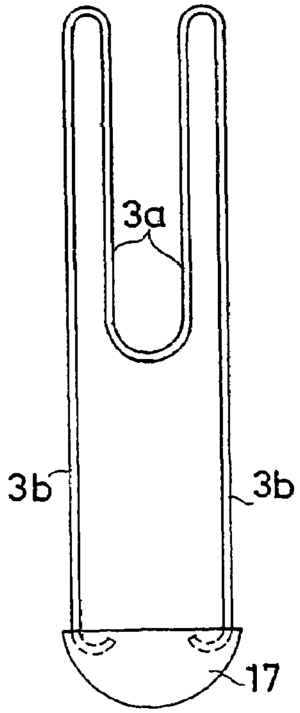
FIG. 13 is a front view showing a modification of the clip shown in FIG. 12.

Further, as shown in FIG. 13, the clip 13 maybe constituted so that a wire material is formed into a generally U shape to provide the clipping one end portion 3*a*, so that upper ends thereof are folded outward to be parallel to an outside of the generally U-shaped clipping one end portion 3*a*, and so that both ends of the clipping one end portion 3*a* are connected by the holding tool 17 having a semicircular lower part to provide the clipping other end portions 3*b*. As shown in FIG. 13, the clipping other end portions 3*b* may be formed to be longer than the clipping one end portion 3*a*. If the thickness of the holding tool 17 is set larger than the diameter of the wire material, the clip 3 exhibits the same function as that of the clip shown in FIG. 12.

Every clip 3 described above can be used as an independent clip.

The front storage part 7 can store a material that contains a volatile component into which a scent component that emanates a desired scent, a medicinal component such as a moth-proof component, a skin protecting component, a sleep prevention component, or the like is impregnated or mixed, or the other emanative component, preferably a sheet-like material containing the emanative component. Thus, a user can carry the attachment having a component according to a purpose stored in the front storage part 7.

Likewise, the rear storage part 8 can store the same material as that of the front storage part 7 as, for example, a backup. The clipping one end portions 3*a* of the clip 3 are inserted into and locked at the respective clip insert storage parts 8*a*. If a lower portion of the rear sheet material 6 is slightly pressed from a rear side to a front side by a fingertip or the like and forced into a pocket while the clipping other end portion 3*b* is caught into, for example, an inside of a pocket opening, the portable attachment 1 can be easily attached into the pocket by one hand. The same thing is true for instances of attaching the attachment 1 to the other things.

A desired decoration can be given on a surface of the front sheet material 4. If the front sheet material 4 is formed out of a transparent material, a display piece that displays a name or the like, a passport, or the like is inserted into the front storage part 7. Alternatively, whether the material is transparent, an IC chip is attached to the sheet-like emanative component-containing material or a non-contact data transmitter-receiver sheet including the IC chip is stored in the front storage part 7 so as to function as a display tool.

A sheet-like liquid crystal display or an LED display can be provided on the surface of the front sheet material 4 to display the name or the like.

Figure 14:
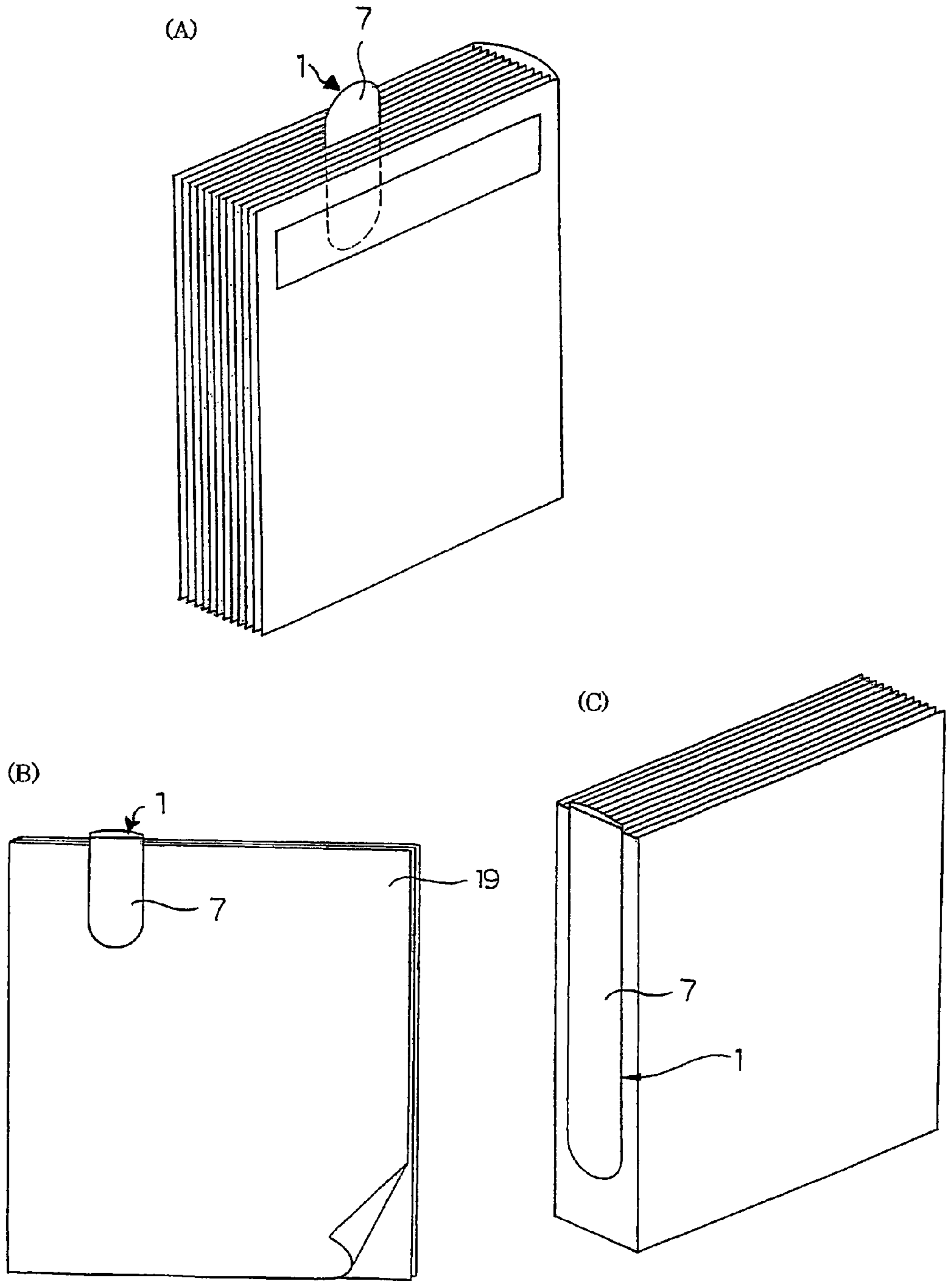
FIGS. 14(A) to (C) are schematic perspective views or front views showing embodiments of using the portable attachment according to the present invention.

By storing the objects in the storage parts 7 and 8 according to each purpose, the attachment 1 can be provided as a multipurpose attachment. For example, as shown in FIG. 14(A), if the emanative component that emanates a desired scent is stored in the storage part 7, the attachment can be used as a perfumed bookmarker. As shown in FIG. 14(B), if paper sheets or the like 19 are bundled and attached to the attachment 1 and a card on which contents of the paper sheets or the like 19 are written is stored in the front storage part 7, it is convenient for storage. As shown in FIG. 14(C), the attachment 1 is attached to the back cover of the file or the like, and a card on which indexes or the like are written can be inserted into the front storage part 7. If a data transmittable-receivable IC chip which records a content of the file or the like is inserted, it is possible to facilitate management of the file or the like.

Figure 15:
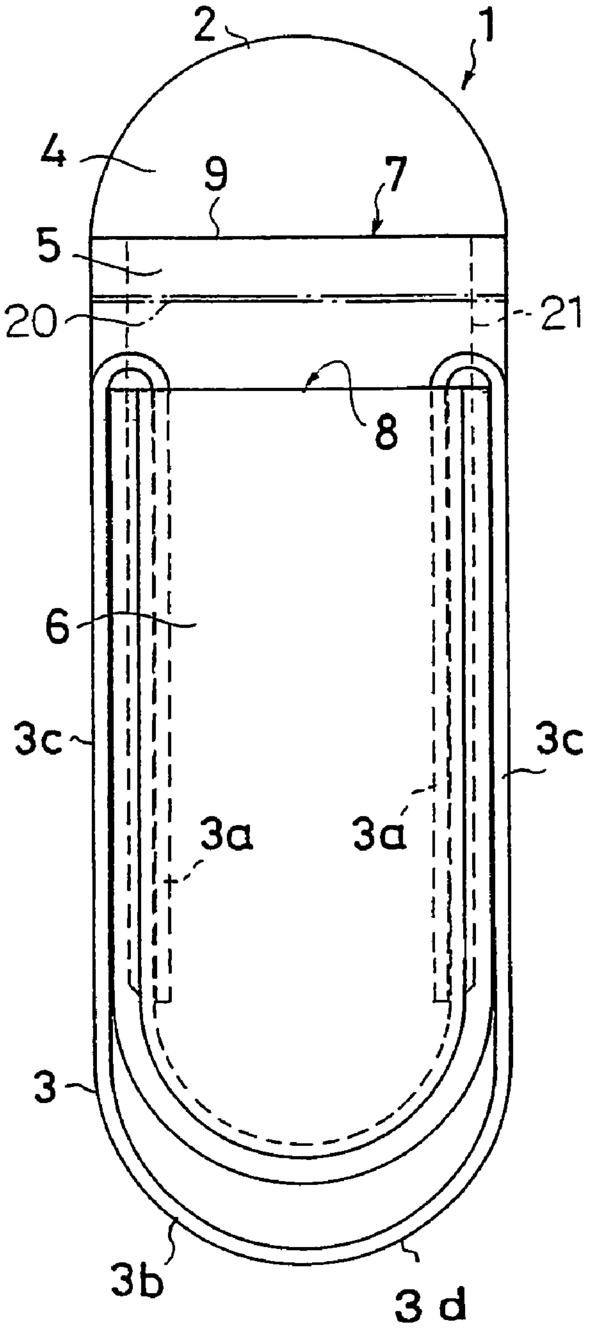
FIG. 15 is a rear view of another embodiment of the portable attachment shown in FIG. 1.

FIG. 15 shows an embodiment other than the embodiment shown in FIG. 1. The attachment 1 in this embodiment differs from the attachment 1 shown in FIG. 1 in the front storage part 7 and the clip insert storage parts 8*a*.

A fastener 20, which has irregularities and which can be engaged with and disengaged from a front side surface of the intermediate sheet material 5 and a rear surface of the front sheet material, is formed in the opening part 9 in parallel to an upper edge of the intermediate sheet material 5. The opening part 9 which can be fixedly attached between the both sheet materials 4 and 5 is thereby formed. In addition, ventilation gaps, in which the intermediate sheet material 5 and the front sheet material 4 are not sealed, are formed below left and right ends of the fastener 20 to have slight heights, respectively, thereby providing a ventilation part 21 which enable the emanative component of the stored object stored inside to emanate externally. The ventilation part 21 may be constituted arbitrarily as long as they can cause the air to pass through, and may be formed in the other region. Alternatively, the ventilation part can be provided by forming the front sheet material 4 out of a breathable material instead of forming the opening part.

The upper end of the rear sheet material 6 is preferably set to have a height so that a sealed portion of the rear sheet material 6 is located at a position of the intermediate sheet material 5 below the ventilation parts 21, and an upper edge of the rear sheet material 6 may be kept opened.

As shown in FIG. 15, the rear storage part 8 can be formed without defining and forming the clip insert storage parts 8*a* on the both sides, and the one end portions 3*a* of the clip 3 can be inserted into the both sides of the interior of this rear storage part 8.

Figure 16:
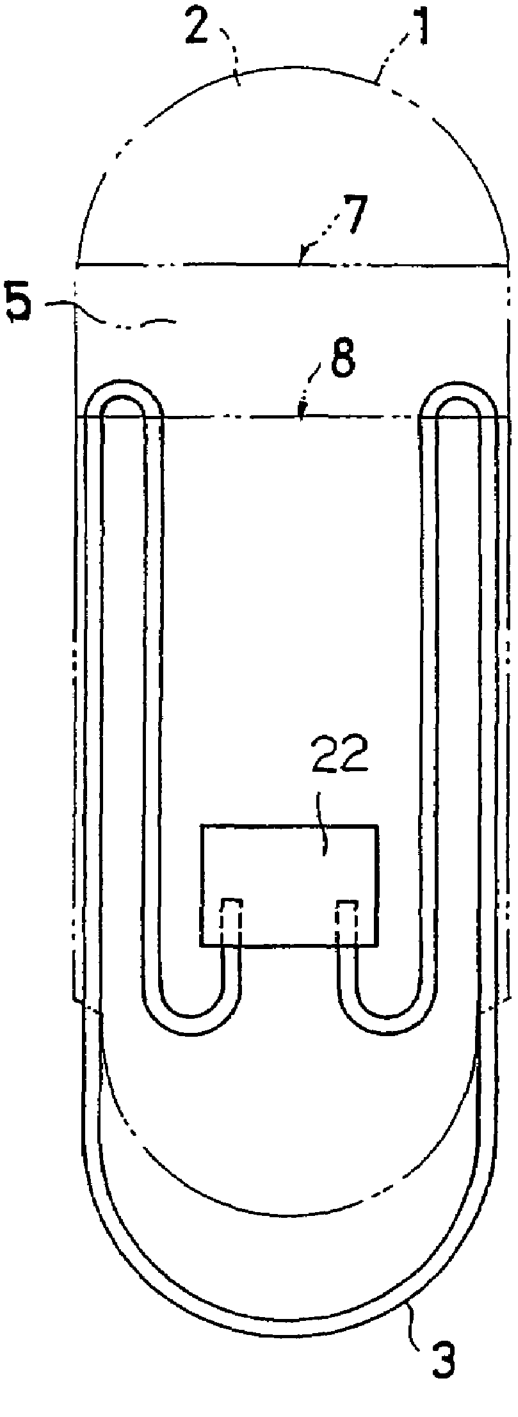
FIG. 16 is a rear view showing an embodiment of including an IC chip into the attachment.

Moreover, a non-contact data transmitter-receiver (of, for example, a sheet shape) 22 including therein an IC chip used for antitheft, passage check, confirmation, or the like can be stored in one of the front storage part 7 and the rear storage part 8. As shown in FIG. 16, the transmitter-receiver can be fixedly attached to the one end portions 3*a* of the clip 3 and stored in the rear storage part 8, with the clip used as an antenna.

The invention claimed is:

1. An attachment with a clip,—wherein at least two synthetic resin sheet materials are laminated on a rear side of a front sheet material consisting of synthetic resin, peripheral edges are sealed except for an opening part to form storage parts—"which attachment includes at least two storage parts each formed by a synthetic resin sheet material and each having peripheral edges sealed except for an opening part", one of the storage parts storing an object used according to a purpose, "the other"—another—storage part including at least the clip by inserting and attaching a clipping one end portion of the clip, which portion is formed by bending a wire material to form a generally U shape and bending upper ends of the generally U shape inward or outward to be parallel to an inside or outside of the generally U shape, into the other storage part, a clipping other end portion of the clip serving as a locking part locked at an attachment target, the attachment target held between the locking part and the storage part side.

2. An attachment with a clip,—wherein at least two synthetic resin sheet materials are laminated on a rear side of a front sheet material consisting of synthetic resin, peripheral edges are sealed except for an opening part to form storage parts—"which attachment includes at least two storage parts each formed by a synthetic resin sheet material and each having peripheral edges sealed except for an opening part", a ventilation part formed in one of the storage parts and the one storage part storing a material that contains an emanative component, "the other"—another—storage part including at least the clip by inserting and attaching a clipping one end portion of the clip, which portion is formed by bending a wire material to form a generally U shape and bending upper ends of the generally U shape inward or outward to be parallel to an inside or outside of the generally U shape, into the other storage part, a clipping other end portion of the clip serving as a locking part locked at an attachment target, the attachment target held between the locking part and the storage part side.

3. An attachment with a clip, wherein at least two synthetic resin sheet materials are laminated on a rear side of a front sheet material consisting of synthetic resin, peripheral edges are sealed except for an opening part to form storage parts, a front sheet material-side storage part serving as a storage part that stores an object used according to each purpose, the object being freely output and input, a rear storage part serving as an attachment part, a clipping one end portion of the clip, which portion is formed by bending a wire material to form a generally U shape and bending upper ends of the generally U shape bent inward or outward to be parallel to an inside or outside of the generally U shape, inserted into at least the attachment part, a clipping other end portion of the clip serving as a locking part locked at an attachment target, the attachment target held between the locking part and the storage part side.

4. An attachment with a clip, wherein at least two synthetic resin sheet materials are laminated on a rear side of a front sheet material consisting of synthetic resin, peripheral edges are sealed except for an opening part to form storage parts, the front sheet material-side storage part storing a material that contains an emanative component with the opening part closable except for the ventilation part, a clipping one end portion of the clip, which portion is formed by bending a wire material to form a generally U shape and bending upper ends of the generally U shape inward or outward to be parallel to an inside or outside of the generally U shape, inserted Into at best the rear storage part, a clipping other end portion of the clip serving as a locking part locked at an attachment target, the attachment target held between the locking part and the storage part side.

5. The attachment with the clip according to claim 1, wherein the rear storage part out of the two storage parts is constituted to form clip insert storage parts "is constituted to form clip insert storage parts" on both sides, respectively, or constituted to be formed as the clip insert storage parts located on both side.

6. The attachment with the clip according to claim 1, wherein a data transmittable end receivable IC chip is stored in the storage part.

* * * * *